United States Patent
Welch

(10) Patent No.: US 6,620,386 B1
(45) Date of Patent: Sep. 16, 2003

(54) RADIAL FLOW REACTOR

(75) Inventor: Vincent A. Welch, Medway, MA (US)

(73) Assignee: Stone & Webster, Inc., Houston, TX (US)

(*) Notice: Subject to any disclaimer, the term of this patent is extended or adjusted under 35 U.S.C. 154(b) by 0 days.

(21) Appl. No.: 09/486,667
(22) PCT Filed: Jul. 6, 1999
(86) PCT No.: PCT/US99/15139
§ 371 (c)(1), (2), (4) Date: Jun. 2, 2000
(87) PCT Pub. No.: WO00/02655
PCT Pub. Date: Jan. 20, 2000

Related U.S. Application Data
(60) Provisional application No. 60/092,157, filed on Jul. 9, 1998.

(51) Int. Cl.[7] .............................. B01J 8/00; B01J 8/02; B01J 8/04; F28D 7/00
(52) U.S. Cl. ............... 422/192; 422/188; 422/190; 422/193; 422/198; 422/200; 422/218; 422/239
(58) Field of Search .............................. 422/188, 189, 422/190, 192, 193, 196, 197, 198, 200, 211, 218, 239, 199

(56) References Cited

U.S. PATENT DOCUMENTS

| | | | |
|---|---|---|---|
| 3,927,987 A | 12/1975 | Winter, III et al. | 422/200 |
| 4,230,669 A | 10/1980 | Eagle et al. | 422/148 |
| 4,321,234 A | 3/1982 | Ohsaki et al. | 422/200 |
| 4,525,482 A | 6/1985 | Ohsaki et al. | 518/707 |
| 4,594,227 A | 6/1986 | Ohsaki et al. | 422/148 |
| 4,714,592 A | 12/1987 | Zanma et al. | 422/192 |
| 4,909,808 A | 3/1990 | Voecks | 48/94 |
| 5,184,386 A | 2/1993 | Zardi et al. | 29/401.1 |
| 5,250,270 A | 10/1993 | Noe | 422/192 |
| 5,461,179 A | 10/1995 | Chen et al. | 585/440 |
| 5,585,074 A | 12/1996 | Zardi et al. | 422/191 |

Primary Examiner—Jerry D. Johnson
Assistant Examiner—Alexa A. Doroshenk
(74) Attorney, Agent, or Firm—Hedman & Costigan, P.C.

(57) ABSTRACT

Apparatus for radial flow reactor and methods of using the reactor for catalytic hydrocarbon processing. The reactor, of annular shaped housing, contains a core region with a heat exchange means. The core region is surrounded by a catalyst bed held by inner and outer walls. The core region and radial catalyst bed are further surrounded by an annular zone containing heat exchange means.

30 Claims, 4 Drawing Sheets

US 6,620,386 B1

RADIAL FLOW REACTOR

This application claims benefit of application Ser. No. 60/092,157 filed Jul. 9, 1998.

The present invention relates generally to a radial flow reactor design with integrated thermal energy exchange, and to methods for using this apparatus to carry out catalyst-facilitated hydrocarbon processing.

BACKGROUND OF THE INVENTION

A variety of familiar hydrocarbon processing operations are facilitated by contacting the hydrocarbon with a selected catalyst in a fixed or fluidized bed under controlled temperature and pressure conditions. One such conventional hydrocarbon processing operation involves the catalytic dehydrogenation of an alkylaromatic hydrocarbon in the presence of steam to a corresponding alkenylaromatic hydrocarbon, for example dehydrogenating ethylbenzene to produce styrene as taught by U.S. Pat. No. 5,461,179 (Chen et al.), which patent is incorporated herein by reference.

The efficiency of these catalyzed hydrocarbon processing operations can often be improved by utilizing a sequence of two or more catalyst beds in line. Thus, the effluent from a first catalyst bed or reaction zone, containing predominantly the desired final product together with unreacted hydrocarbon, is fed to a second catalyst bed or reaction zone located downstream from the first, where further reaction takes place to further increase the concentration of the desired product in the effluent from the second catalyst bed or reaction zone. In the same fashion, a third, fourth, or additional in-line, downstream catalyst beds/reaction zones may be added as desirable.

Between the two or more catalyst beds/reaction zones, the effluent from an upstream catalyst bed/reaction zone may have to be heated or cooled (depending on whether the reaction is endothermic or exothermic) to properly prepare it for further conversion to the desired product in the next downstream catalyst bed/reaction zone. Thus, if the catalyzed reaction is essentially endothermic in nature, the effluent will have to be heated between two catalyst beds/reaction zones to insure that the downstream catalytic conversion proceeds efficiently, or possibly, at all.

One such endothermic reaction is the catalyzed dehydrogenation of ethylbenzene to styrene. Thus, as described in U.S. Pat. No. 5,461,179, located in-line between the upstream catalytic reactor 50 and the downstream catalytic reactor 54 of that patent is an external reheater 52 to reheat the effluent coming from upstream reactor 50. Typically in such ethylbenzene dehydrogenation, the endothermic reaction is carried out in two or more single bed adiabatic reactors, with effluent from an upstream reactor being reheated in an external shell and tube exchanger before being fed to the downstream reactor. Performing the reheat step in this manner results in additional pressure drop (due to high frictional losses in the exchanger tubes), as well as an increase in void volume (empty space) because of the additional piping required. Higher system pressure results in yield losses to low value byproducts, and lowers apparent catalyst activity (due to equilibrium and coking effects). Larger void volume results in yield losses and formation of undesirable product impurities via non-selective thermal reactions. Therefore, it is highly advantageous to devise an economical way of circumventing these limitations of the conventional process.

The utility of multi-stage catalytic reactor designs is therefore limited by a variety of physical, economic, process, and thermodynamic factors. Because of space considerations, more compact reactor designs are generally desirable. Some catalyzed hydrocarbon reactions, such as ethylbenzene-to-styrene, benefit from maintaining relatively low operating pressures. The ability to rapidly add relatively large amounts of heat to the effluent between the reactor stages of the ethylbenzene-to-styrene process is limited by economic, metallurgical, and thermodynamic considerations. Thus, if superheated steam is used to reheat the effluent it may be necessary to use steam at extremely high temperatures to provide sufficient thermal energy in the limited mass of added steam. That in turn may require the use of more expensive, thermally-resistant materials in connection with the reheater. Accordingly, it is desirable to develop an improved design for a multi-stage catalytic reaction process that would alleviate some of the problems inherent in the prior art reactor designs.

Various types of so-called radial or axial/radial flow reactor designs are known in the art for various applications whereby at least a part of a process stream moves, at some point, through the reactor in a radial (i.e., inward-to-out or outward-to-in) direction, as opposed to the more familiar axial flow (i.e., end-to-end) reactor designs. For example, U.S. Pat. No. 4,321,234, which is incorporated herein by reference, discloses a type of radial flow reactor involving a single reaction chamber. This apparatus comprises an inter-cylinder chamber defined by a gas-permeable, cylindrical outer catalyst retainer, which is disposed inside an outer shell, and a gaspermeable, cylindrical inner catalyst retainer provided within the outer catalyst retainer. A plurality of vertically.extending heat-exchanging tubes are arranged in the reaction chamber in circular groups which are concentric with the common central axis of both of the catalyst retainers. A feed gas is supplied to either the outer gas flow passage or the inner gas flow passage and is caused simultaneously and uniformly to flow in all radial directions, either radially outwardly or radially inwardly. That is, the gas makes one pass through the entire annular extent of the cross section of the catalyst bed.

Another earlier patent, U.S. Pat. No. 4,594,227, which is incorporated herein by reference, discloses a reactor in which a feed gas is caused to flow radially through a catalyst bed packed in an annular space defined by two coaxial cylinders having different diameters. A vertically extending, annular, inter-cylinder space, defined between an outer catalyst retainer cylinder and an inner catalyst retainer cylinder, is divided into a plurality of chambers by radially extending vertical partition walls. Heat exchanging tubes are disposed vertically in the chambers for maintaining the proper temperature for the catalytic reaction. A catalyst is packed in the chambers, forming reaction chambers through which a feed gas flows-in radial directions. The heat exchangers make it apparent that this reactor is indirectly fired and depends on convective heat transfer.

U.S. Pat. No. 4,909,808, which is incorporated herein by reference, improves on the reactor design of U.S. Pat. No. 4,594,227 by providing a steam reformer contained within a cylindrical structure having a catalytic reactor tube of annular shape. Rather than using an external heating device to bring hot gases into the reactor tube, this invention utilizes a type of catalytic combustor located at the center of the cylindrical structure. Thus, two different catalytic reactions are taking place: one reaction common to catalytic reaction tubes of steam reformers, and a second reaction for creating the heat required for the steam reformer. This internal placement of the heat source and use of a catalytic combustor enhances heat transfer by both radiation and convection.

The improvement in these characteristics is primarily due to the ability to control the heat flux (the amount of heat available from the fuel on the outside of the reactor tube) so as to match the amount of heat required by the reaction taking place inside the catalyst bed with the heat and temperature of the combustion gas outside the reactor.

Another so-called radial flow catalytic reactor is shown in U.S. Pat. No. 4,714,592, which is incorporated herein by reference. In this case because the targeted catalytic reaction is exothermic, there is a need to remove excess heat from the reaction environment. This is achieved by means of inlet and outlet pipes containing a coolant which is circulated through a coolant passage structure that penetrates the catalyst bed in order to absorb the heat of reaction. Other patents showing at least partial radial flow reactor designs include U.S. Pat. Nos. 4,230,669; 5,250,270; and 5,585,074, each of which is also incorporated herein by reference.

None of the foregoing patents, however, show a reactor design that is truly well suited for efficient single or multi-stage radial reactor processing of a hydrocarbon wherein the catalytic reaction is highly endothermic or exothermic in nature, thereby requiring respectively either significant and highly uniform heat inputs to the process stream or heat removal from the process stream before and/or after a single catalyst bed or before, after, and/or between serial catalyst beds. These and other drawbacks with and limitations of the prior art reactors are overcome in whole or in part with the reactor design of this invention.

OBJECTS OF THE INVENTION

Accordingly, a principal object of this invention is to provide a means of integrated thermal energy exchange in a radial flow reactor design for single or multi-stage catalytic bed processing of a hydrocarbon.

It is a general object of this invention to provide a compact, efficient and economical approach to single or multi-stage catalytic bed processing of a hydrocarbon.

A specific object of this invention is to provide improved radial flow reactor designs, and methods for using them, in connection with single or multi-stage catalytic bed processing of a hydrocarbon integrated with a thermal energy exchange system for either adding or withdrawing heat before, after, and/or between serial catalyst beds or adding and/or withdrawing heat upstream and/or downstream of a single catalyst bed.

Still another specific object of this invention is to provide an improved radial flow type reactor apparatus and methods for effecting single or multi-stage catalytic bed dehydrogenation of an alkylaromatic hydrocarbon to a corresponding alkenylaromatic hydrocarbon, specifically ethylbenzene to styrene.

Other objects and advantages of the present invention will in part be obvious and will in part appear hereinafter. The invention accordingly comprises, but is not limited to, the methods and related apparatus, involving the several steps and the various components, and the relation and order of one or more such steps and components with respect to each of the others, as exemplified by the following description and the accompanying drawings. Various modifications of and variations on the method and apparatus as herein described will be apparent to those skilled in the art, and all such modifications and variations are considered within the scope of the invention.

SUMMARY OF THE INVENTION

In the present invention, one or more annular-shaped catalyst beds are contained within the interior of a reactor shell, with heating or cooling being carried out in the core region of the reactor interior and/or in annular regions between serial catalyst beds or, alternatively, in front of and/or behind a single catalyst bed. In a representative embodiment, after leaving a first, inner catalyst bed, the process stream passes substantially radially through a reheat (or cooling) annulus containing heating (or cooling) means, such as one or more rows of heating (or cooling) tubes, followed by a mixing element (such as a set of perforated or slotted plates), before entering a second, outer annular catalyst bed. In a representative embodiment of the invention, a heat transfer medium flowing inside the heating (or cooling) tubes supplies heat to (or withdraws heat from) process gases. This scheme results in negligible reheat pressure drop and a substantial reduction in void volume as compared to the use of a more conventional external shell and tube heat exchanger. Consequently, process yield is improved and a significant reduction in equipment cost is achieved by elimination of two or more vessels and their associated piping.

In general, the heating or cooling means of this invention comprises a thermal heat exchange apparatus positioned relative to at least one annular catalyst bed such that gaseous process streams flowing radially into or out of any one or more annular catalyst beds are heated or cooled as desired. In one embodiment, the thermal heat exchange apparatus may be located in the core region of the reactor inside the annulus of a single annular catalyst bed or of the innermost catalyst bed of a series of radially-spaced concentric annular catalyst beds. In another embodiment, the thermal heat exchange apparatus may be located in the annular region surrounding the outside of a single annular catalyst bed. In another embodiment, a first thermal heat exchange apparatus may be located in the core region of the reactor and a second thermal heat exchange apparatus may be located in the annular region surrounding the outside of a single annular catalyst bed or in the annular region separating a first, inner annular catalyst bed from a second, outer annular catalyst bed. In similar fashion, additional radially-spaced concentric annular catalyst beds may be located within the reactor and additional thermal heat exchange apparatuses may be located between some or all of them, as well as in the annular region surrounding the outermost of those catalyst beds.

DETAILED DESCRIPTION OF PREFERRED EMBODIMENTS

Figure 1:
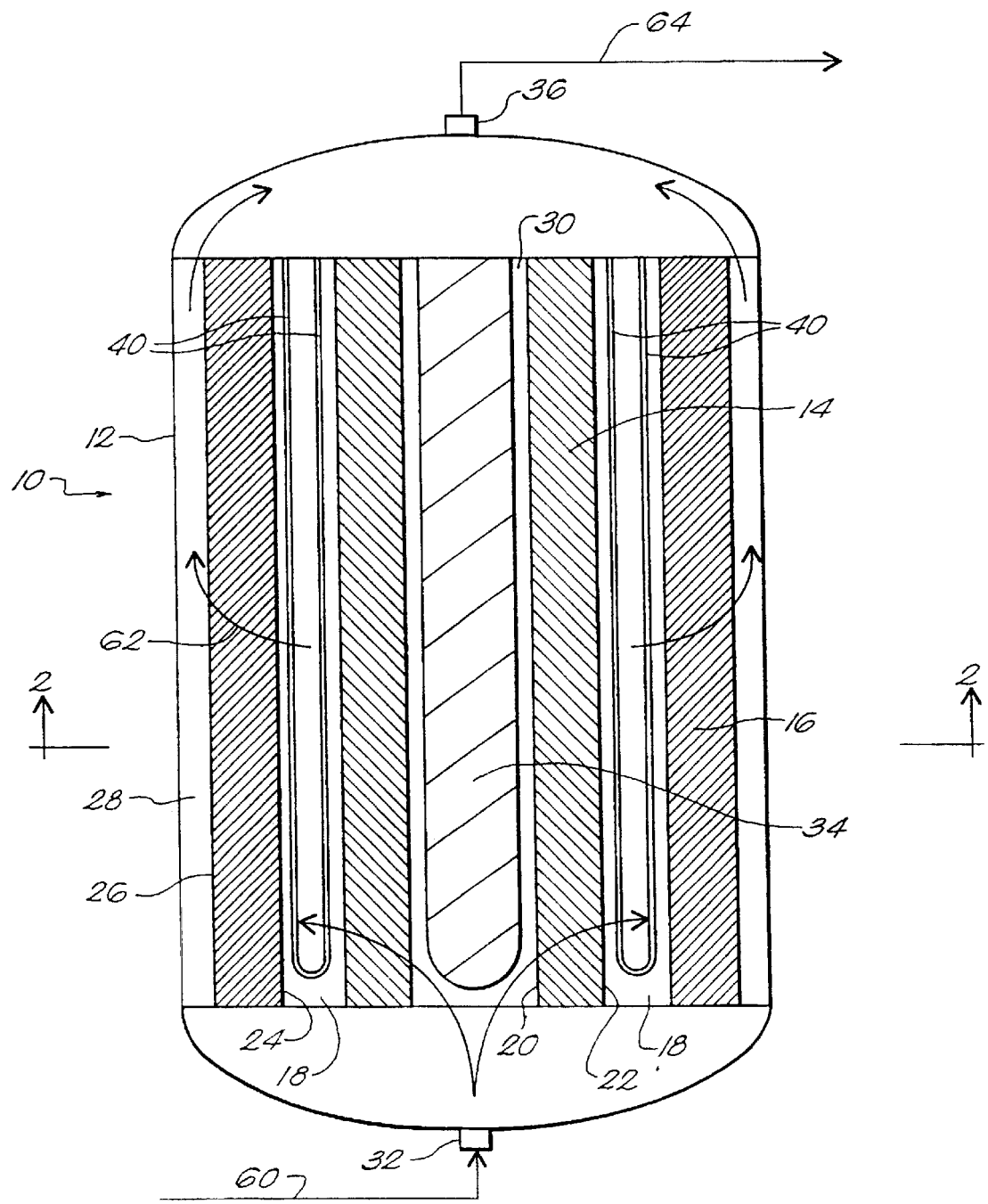
FIG. 1 is a schematic front sectional view of one embodiment of a multi-annular bed, radial flow reactor according to this invention, employing integrated inter-bed thermal energy exchange.

The schematic front sectional view of FIG. 1 shows a multi-annular bed, radial flow reactor 10 in accordance with this invention. Reactor 10 comprises a generally cylindrical outer shell or housing 12 and, contained therein, two annular catalyst beds or reaction zones 14 and 16 spaced radially and substantially uniformly apart from one another and separated by an annular reheating (or cooling) region or thermal energy zone 18. The generally cylindrical and substantially concentric wall sections which define the inner and outer walls (reference numerals 20 and 22 respectively) of inner bed 14 and the inner and outer walls (reference numerals 24 and 26 respectively) of outer bed 16 (see FIG. 2) comprise a screen or porous material having a mesh size large enough to pass a fluid flow stream without undue resistance or a high pressure drop, yet small enough to retain the catalyst material therein.

Figure 3:
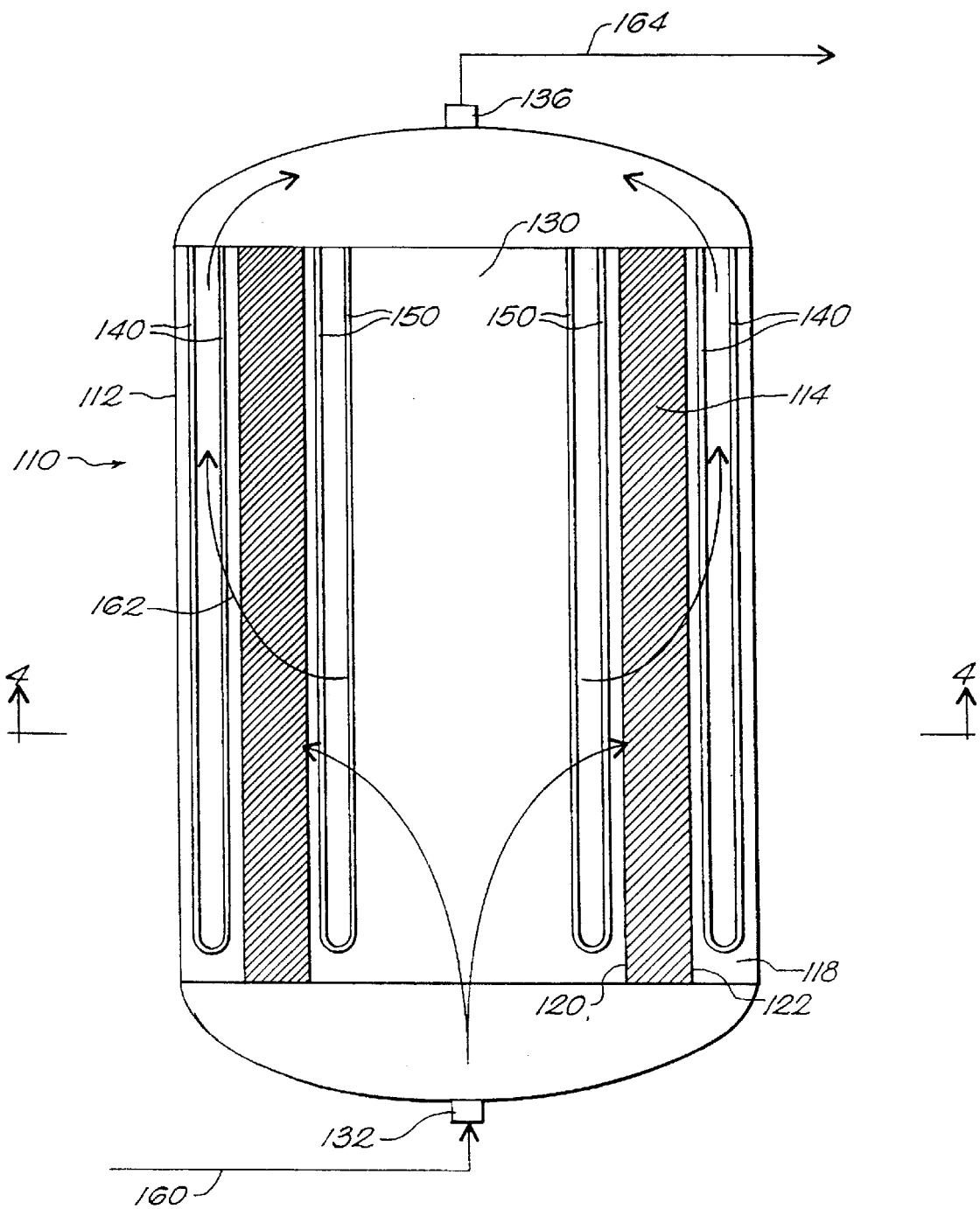
FIG. 3 is a schematic front sectional view of a second embodiment of a radial flow reactor according to this invention employing a single annular catalyst bed and integrated thermal energy exchange both in the reactor core and in the annular region radially surrounding the catalyst bed.
Figure 4:
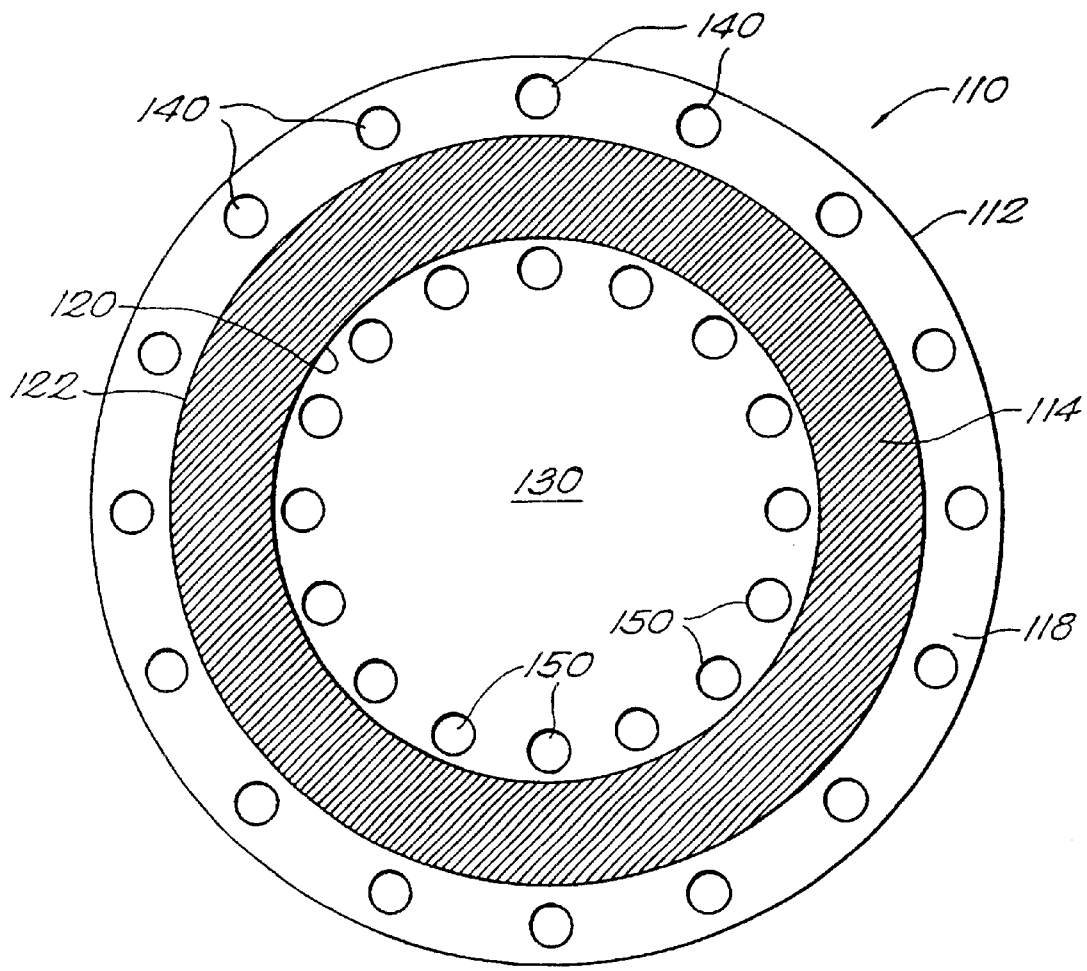
FIG. 4 is a schematic top sectional view of the reactor of FIG. 3 taken along the line 4—4.

It will be apparent that in FIG. 1 the outer wall 22 of inner bed 14 forms the inner wall of reheating (or cooling) zone 18, and the inner wall 24 of outer bed 16 forms the outer wall of reheating (or cooling) zone 18. It will also be apparent to those skilled in the art that, although FIG. 1 illustrates an embodiment of this invention wherein two radially-spaced annular-shaped catalyst beds are separated by a single annular-shaped reheating (or cooling) zone, additional radially-spaced annular catalyst beds could be added, each separated from the next inward or outward catalyst bed by another annular reheating (or cooling) zone. When only one catalyst bed is used in the reactor, as discussed in connection with FIGS. 3 and 4, the reheating (or cooling) zone can be located either in front of or behind the catalyst bed, or, alternatively, both in front of and behind the catalyst bed as shown in FIGS. 3 and 4.

The inner wall 20 of inner bed 14 is radially-spaced from the common central axis of reactor 10 so as to define an inner cylindrical core region 30. A reactor inlet feed or reaction stream 60, comprising the hydrocarbon to be treated in the reactor at suitable temperature and pressure, is fed to region 30 of reactor 10 via a reactor inlet 32. Although FIG. 1 shows reaction stream 60 being fed to the bottom of reactor 10, and product stream 64 being withdrawn from the top of reactor 10, it will be understood that this arrangement can be reversed without affecting the operation of this radial flow apparatus. Thus, it is also within the scope of this invention to feed reaction stream 60 to the top of reactor 10 and to withdraw product stream 64 from the bottom of reactor 10.

Although FIG. 1 shows reaction stream 60 being fed to the core region 30 of reactor 10 and product stream 64 being withdrawn from the outermost annular region 28 of reactor 10, it will be understood that this arrangement can be reversed without affecting the operation of this radial flow apparatus. Thus, it is also within the scope of this invention to feed reaction stream 60 to the outermost annular region 28 of reactor 10 and to withdraw product stream 64 from the core region 30 of reactor 10.

For a styrene plant, for example, feed stream 60 may comprise a mixture of ethylbenzene and steam. In the FIG. 1 embodiment of the present invention, fluid displacement means 34, such as a displacement cylinder as illustrated in FIG. 1, of suitable size and shape may optionally be positioned inside region 30. The purpose of such a displacement cylinder 34 is to help direct incoming feed stream 60 in a substantially radial direction into the first catalyst bed and to minimize residence time of the feed stream in region 30 where undesirable chemical reactions might occur. Arrows in FIG. 1 illustrate how cylinder 34 helps direct feed stream 60 substantially radially into catalyst bed 14. As shown by the process stream arrows in FIG. 1, in the portion of the catalyst bed 14 adjacent wall 20, there may be some relatively small axial component to the process stream flow. Similarly, in the portion of catalyst bed 16 adjacent wall 26, there may also be some relatively small axial component to the process stream flow. Throughout most of catalyst beds 14 and 16, however, and through substantially all of thermal exchange zone 18, the process stream flow direction is virtually completely radial. This distinguishes this invention from many of the earlier-mentioned prior art apparatuses wherein there is only partial or minimal radial flow of the process stream through the reactor, or where there is both inward and outward radial flow as contrasted with the unidirectional radial flow (either outward or inward) of this invention.

As shown in FIG. 1, the hydrocarbon feed stream will pass substantially radially through catalyst bed 14 resulting in at least partial conversion of the hydrocarbon to the desired final product. The effluent product stream 62 emerging substantially radially from bed 14 through wall 22 passes directly into annular reheating zone 18. If the catalyzed reaction which occurred in bed 14 was endothermic, such as an ethylbenzene-to-styrene conversion, effluent product stream 62 from bed 14 will be at a lower temperature than incoming feed stream 60, and will require reheating in zone 18 to bring it back up to an optimal temperature before passing it into the second catalyst bed 16.

Figure 2:
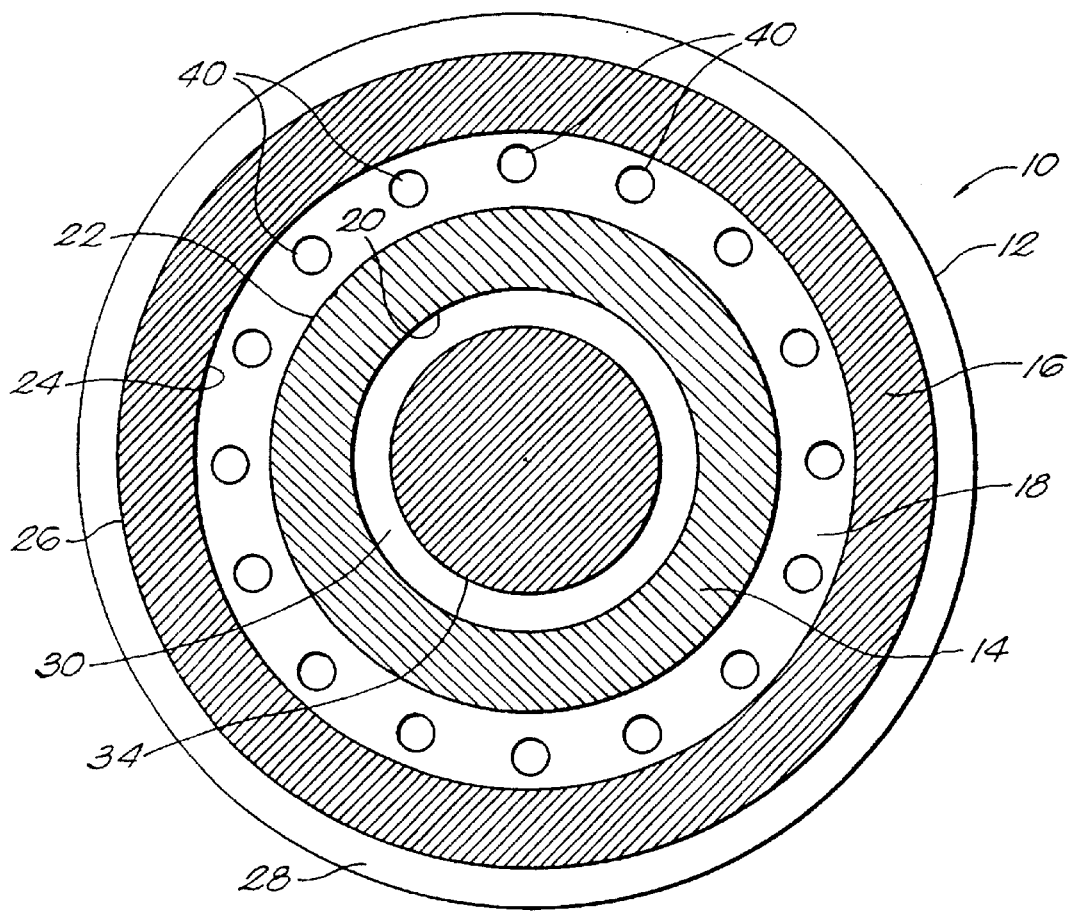
FIG. 2 is a schematic top sectional view of the reactor of FIG. 1 taken along the line 2—2.

A variety of approaches to and thermal heat exchange apparatus for generating and transferring thermal energy can be advantageously adapted to supply heat to reheating zone 18 of reactor 10. One approach, illustrated in FIGS. 1 and 2, is to run a set of axially-disposed, thermally-conductive thermal exchange (i.e., heating or cooling) tubes 40 into, through, and back out of zone 18. The external surface of the tubes 40, which inside contain a suitable heat transfer medium/fluid, can be either bare or finned the latter being preferable due to the fact that the number of tubes required to perform the heat addition or removal, and thus the size of the annular region 18 needed to contain the tubes, can be substantially reduced thereby.

The temperature of the process fluid leaving the heating tube bank in zone 18 normally will not be evenly distributed in a radial direction. The extent of this temperature maldistribution will depend primarily on tube spacing and the number of tube rows. Decreasing tube spacing will reduce the radial temperature maldistribution, but at a cost of increasing the number of tubes. A preferred way of correcting the radial temperature maldistribution is by use of single or multiple mixing devices downstream of the heating tube bank. Preferably, these mixing plates contain slots or vertical rows of holes aligned with tube centers. Results of rigorous heat and mass transfer simulations have shown that such a design is capable of reducing the extent of radial temperature maldistribution in this type of apparatus by an order of magnitude without a significant increase in pressure drop.

Uneven heating tube wall temperatures along the length of a heating tube will cause axial temperature maldistribution (i.e., temperature differences between the process fluid at the top and bottom of the reactor), adversely affecting catalyst performance. It is preferred, however, that the thermal heat exchange apparatus be of suitable size and shape, and be suitably positioned relative to said first catalyst bed 14, so as to be capable of providing substantially axially uniform thermal energy exchange. Since the temperature and flow of the process fluid leaving the first catalyst bed 14 is generally axially uniform, it follows that the only way to achieve substantial axial uniformity of thermal exchange is to somehow maintain the heating tubes at a constant temperature from top to bottom. This ideal axial temperature distribution can be approached by a number of means, such as by circulating a heating medium (usually a high heat capacity liquid) at a rate sufficiently high to keep the tube side temperature drop very low.

For gaseous heating media (such as superheated steam) where circulation is not practical, the occurrence of axial temperature gradients in the process fluid can be minimized by use of multiple pass tubes. Similarly, heat can be supplied to the process fluid via a circulating liquid, such as a highly stable heat transfer fluid or molten salt. The liquid circulation rate should be sufficiently high as to minimize the temperature drop along the heating tubes. In these cases, heat is supplied to the heat transfer fluid externally by means of a fired or an electric heater. Other techniques for supplying thermal energy to reheating zone 18, however, will be apparent to those of ordinary skill in this art.

For particular hydrocarbon processing operations, some techniques for supplying thermal energy to reheating zone 18 will be seen to have particular synergies and/or efficiencies. Thus, as one example, supplying heat to the heating medium directly inside the tube, such as by combustion or electrical resistance heating, is useful in the manufacture of styrene by ethylbenzene dehydrogenation among other processes.

In the conventional ethylbenzene-to-styrene dehydrogenation process, steam, which is co-fed with the hydrocarbon feed, is used both as a heating medium and as diluent, for the purpose of lowering the partial pressure of the reactants, a requirement necessary in order to overcome the equilibrium limitations and prevent catalyst coking. Limitations with this type of system are the type of metallurgy required and the physical size of the reheat exchanger. Likewise, these limitations are present whether reheat is performed externally in a shell and tube exchanger, or internally in an annular space between two radially-spaced annular catalyst beds contained in the same vessel.

With the advent of highly stable, active dehydrogenation catalysts, the amount of steam required by the process is no longer strictly governed by the catalyst constraints, but also by temperature limits of process heat exchanger equipment, in particular the reheater exchanger. Older dehydrogenation catalysts required on the order of 8 to 12 moles of steam per mole of hydrocarbon feed, while newer catalyst products only require 5 to 7 moles of steam per mole of hydrocarbon feed.

In the ethylbenzene-to-styrene dehydrogenation process, process steam is typically provided to the reheater in the temperature range of 1450° F. to 1650° F. At temperatures below 1500° F., 304SS is an economic and practical material of construction. For temperatures above 1500° F., however, which are in general required for low steam-to-hydrocarbon ratio catalysts (5 to 7 moles steam/mole hydrocarbon), expensive, high-temperature resistant alloys, such as 800H/HT must be specified. Alternatively, the maximum steam side temperature can be reduced by increasing the heat transfer area, but at the expense of higher equipment cost and additional pressure drop (particularly in the case of external shell and tube exchangers).

These limitations can be overcome by decoupling the role of the steam stream as both the heating medium and process diluent. This can be accomplished by supplying heat directly to the process in the manner described above. Examples of direct heating involve the circulation of a heating medium such as steam, flue gas, or molten salt, electrical resistance heating or by combustion of a fuel inside a heat tube itself.

One partially efficacious method of supplying heat directly inside a heat tube, the outside of which is in contact with the process fluid, is by means of flameless combustion of fuel gas (such as hydrogen or a hydrocarbon). One such flameless combustion design is taught by U.S. Pat. Nos. 5,255,742 and 5,404,952, which are incorporated herein by reference. One of the advantages of this method is a relatively uniform tube temperature distribution which can be achieved by proper fuel distribution inside the tube. Thus, the application of the method of U.S. Pat. Nos. 5,255,742 and 5,404,952 is particularly advantageous to the process scheme of the present invention wherein the reheat is carried out inside a single or multi-bed radial flow reactor.

Another method of combusting fuel inside the heat tube involves the use of a porous material such as sintered metal or micro-porous ceramics. In this alternative, a double pipe arrangement is utilized wherein the inner pipe is constructed of a porous material and the outer pipe acts as a combustion chamber. One alternative would be to feed fuel through the inner porous pipe and inject the fuel into an air stream flowing in the annulus of the outer pipe.

The thus reheated effluent product stream 62, flowing substantially radially from reheating zone 18, then passes through wall 24 and enters the second catalyst bed 16 where further reaction/conversion of the unreacted hydrocarbon takes place as the process stream passes substantially radially through bed 16. Effluent product stream 64 emerging from catalyst bed 16 passes through wall 26 into an outermost annular collection region 28 defined by wall 26 on one side and, on the other, the inner surface of the shell or housing member portion 12 of reactor 10. In collection region 28, effluent product stream 64 flows in a generally axial direction to reactor outlet 36, where effluent product stream 64 leaves reactor 10 through reactor outlet 36 and is sent downstream for further processing and separation of the components, including recovery of the desired product. As previously noted, product stream 64 may alternatively be withdrawn from the bottom of reactor 10 instead of the top, and may be withdrawn from core 30 instead of annulus 28.

FIGS. 3 and 4 illustrate an alternative embodiment of the radial flow reactor of this invention. In this alternative embodiment, radial flow reactor 110 comprises a generally cylindrical outer shell or housing 112 and, contained therein, a single annular catalyst bed or reaction zone 114 surrounding a reactor core zone 130 comprising a generally cylindrical region defined by the inner wall 120 of catalyst bed 114. Also in this alternative embodiment, a thermal heat exchange apparatus 150 is located inside core zone 130 to heat (or cool) the reactor inlet feed or reaction stream 160 which is fed to core zone 130 via a reactor inlet 132. In this embodiment, thermal heat exchange apparatus 150, which may comprise any suitable heating (or cooling) means such as those previously described in connection with FIGS. 1 and 2, serves to provide thermal exchange to incoming feed or reaction stream 160 before passing the reaction stream in a substantially radial direction into catalyst bed 114.

As noted above for the embodiment of FIGS. 1 and 2, although FIG. 3 shows reaction stream 160 being fed through the bottom of reactor 110 to core zone 130, it is also within the scope of the invention to feed reaction stream 160 through the top of reactor 110 instead of the bottom, and/or to feed reaction stream 160 to the outermost annular region 118 instead of to core zone 130.

For example, as shown in FIG. 3, in a styrene operation, feed/reaction stream 160 may comprise a mixture of ethylbenzene and steam. Feed stream 160 is heated to a suitable temperature in core zone 130 by contact with thermal heat exchange apparatus 150 and is then passed substantially radially through inner wall 120 into and through catalyst bed 114 resulting in at least partial conversion of the hydrocarbon to the desired final product. The effluent product stream 162 emerging substantially radially from bed 114 through outer wall 122 passes directly into annular zone 118, which may be a collection zone, or a reheating (or cooling) zone, or both.

If reactor 110 comprises a single-bed reactor, as in fact illustrated in FIGS. 3 and 4, zone 118 will be a collection or collection/heating (or cooling) zone in which the effluent product stream 162 is flowed in a generally axial direction to reactor outlet 136, where effluent product stream 164 leaves reactor 110 through reactor outlet 136 and is sent downstream for further processing. It will be understood that, as discussed above, it is also within the scope of this invention to, alternatively, withdraw product stream 164 from the bottom of reactor 110 and/or from core zone 130. In a variation of this embodiment, as shown in FIGS. 3 and 4, collection zone 118 may also serve as a reheating (or cooling) zone by locating a second thermal energy exchange apparatus 140 in zone 118 to better prepare effluent product stream 164 for downstream processing.

Alternatively, in another variation of this embodiment of the invention (not shown), reactor 110 may comprise a multi-bed reactor similar to that illustrated in FIGS. 1 and 2. In this embodiment, one or more additional concentric annular catalyst beds (comparable to bed 16 in FIGS. 1 and 2) will be positioned inside reactor 110. In this variation annular zone 118 surrounding innermost bed 114 may or may not include a second thermal energy exchange apparatus 140 to reheat (or cool) effluent product stream 162 as it passes substantially radially through zone 118 and into and through the second (or subsequent) catalyst bed.

In this embodiment, an annular collection region surrounding the outermost catalyst bed (comparable to region 28 in FIGS. 1 and 2) will be utilized for collecting the effluent product stream emerging from the outer wall of the outermost catalyst bed and flowing that product stream in a generally axial direction to reactor outlet 136. The annular collection region of this multi-bed radial flow reactor may, in some embodiments include an additional thermal energy exchange apparatus to provide heating (or cooling) to the effluent product stream on its way to reactor outlet 136.

It will be apparent to those skilled in the art that other changes and modifications may be made in the above-described apparatus and process without departing from the scope of the invention herein, and it is intended that all matter contained in the above description shall be interpreted in an illustrative and not a limiting sense.

What is claimed is:

1. A radial flow reactor apparatus comprising in combination:

(a) a substantially cylindrical reactor housing, said housing defining a reactor interior including a reactor core region around a central axis of said reactor, a reactor inlet region adjacent to a first end of said reactor core region, and a reactor outlet region adjacent to a second end of said reactor core region;

(b) a reactor feed inlet for feeding a fluid reactant stream to said reactor inlet region;

(c) a first annular-shaped catalyst bed region of said reactor interior radially surrounding said reactor core region, said first annular-shaped region being defined by substantially concentric first bed inner and outer walls of a porous material of suitable mesh size to retain a first bed of catalyst material therein while permitting fluid flow therethrough;

(d) a second annular-shaped region radially surrounding said first annular-shaped region wherein the outer wall of said first annular-shaped region also defines the inner wall of said second annular-shaped region;

(e) a reactor product outlet for withdrawing a fluid reactor product stream from said reactor outlet region;

(f) a plurality of axially-disposed heat exchange tubes located outside of said catalyst bed region in said reactor core region alongside said first bed inner wall, in said second annular-shaped region alongside said first bed outer wall, or both;

further wherein said reactor interior defines a fluid stream flow path consisting sequentially of: a first axial segment running substantially axially from said reactor inlet region into the reactor core region without passing through any part of said catalyst bed region; a radial segment running substantially radially from said reactor core region across any heat exchange tubes alongside said first bed inner wall, through said catalyst bed region, across any heat exchange tubes alongside said first bed outer wall and into said second annular-shaped region; and a second axial segment running substantially axially from said second annular-shaped region to said reactor outlet region.

2. A radial flow reactor apparatus according to claim 1 wherein said heat exchange tubes are located in said reactor core region.

3. A radial flow reactor apparatus according to claim 1 wherein said heat exchange tubes are of suitable shape, number and size, and are suitably positioned relative to said first catalyst bed region, so as to provide substantially axially uniform thermal energy exchange to the fluid stream before it flows radially into said first catalyst bed region, after it flows radially out of said first catalyst bed region, or both.

4. A radial flow reactor apparatus according to claim 1 wherein said heat exchange tubes are spaced apart and arranged in a generally circular configuration proximate to said first bed inner wall, or said first bed outer wall, or both.

5. A radial flow reactor apparatus according to claim 1 wherein said heat exchange tubes are spaced apart and arranged in a generally circular configuration alongside said first bed outer wall.

6. A radial flow reactor apparatus according to claim 1 wherein at least some of said heat exchange tubes include fin members.

7. A radial flow reactor apparatus according to claim 1 wherein said heat exchange tubes comprise a plurality of axially-disposed heat exchange tubes carrying a flowing heat transfer medium.

8. A radial flow reactor apparatus according to claim 1 wherein said heat exchange tubes comprise a plurality of thermally conductive, axially-disposed heat exchange tubes, each containing means for internal controlled combustion of a combustible material and means for feeding the combustible material and an oxidant to the inside of said tubes.

9. A radial flow reactor apparatus according to claim 1 wherein said heat exchange tubes comprise a plurality of axially-disposed heat exchange tubes filled with a heat transfer medium and means for heating or cooling said heat transfer medium.

10. A radial flow reactor apparatus according to claim 9 wherein said means for heating comprises an electrical resistance heater.

11. A radial flow reactor apparatus according to claim 1 further comprising a third annular-shaped region in said reactor interior, said third region radially surrounding said second annular-shaped region and radially-spaced from said first bed of catalyst material, wherein said third annular-shaped region is defined by substantially concentric second bed inner and outer walls of a porous material of suitable mesh size to retain a second bed of catalyst material therein while permitting fluid flow therethrough; and, a fourth annular-shaped region radially surrounding said third annular-shaped region.

12. A radial flow reactor apparatus according to claim 11 comprising heat exchange tubes located in said second annular-shaped region.

13. A radial flow reactor apparatus according to claim 12 further comprising fluid displacement means located in said reactor core region.

14. A radial flow reactor apparatus according to claim 11 comprising a first set of heat exchange tubes located in said reactor core region and a second set of heat exchange tubes located in said second annular-shaped region.

15. A radial flow reactor apparatus according to claim 11 comprising a first set of heat exchange tubes located in said reactor core region, a second set of heat exchange tubes located in said second annular-shaped region, and a third set of heat exchange tubes located in said fourth annular-shaped region.

16. A radial flow reactor apparatus according to claim 1 comprising a plurality of radially-spaced annular-shaped catalyst beds, each said catalyst bed being defined by substantially concentric inner and outer walls of a porous material of suitable mesh size to retain the catalyst material therein while permitting fluid flow therethrough; and, a set of heat exchange tubes axially disposed in at least one of the annular-shaped regions separating adjacent catalyst beds.

17. A method for processing a fluid reactant stream by contact with a catalyst material contained within a substantially cylindrical reactor comprising a reactor core region around a central axis of said reactor, a reactor inlet region adjacent to a first end of said reactor core region, a reactor outlet region adjacent to a second end of said reactor core region, at least a first annular-shaped catalyst bed radially surrounding said reactor core region and defined by substantially concentric first bed inner and outer walls of a porous material, and a first annular-shaped collection region radially surrounding said first catalyst bed, said reactor further comprising axially-disposed heat exchange tubes located in said reactor core region alongside said first bed inner wall, in said first annular-shaped collection region alongside said first bed outer wall, or both, said method comprising in sequence the following steps:

(a) flowing a fluid reactant stream in a substantially axial direction from said reactor inlet region into said reactor core region without passing through any part of said first catalyst bed;

(b) flowing said fluid reactant stream in a substantially radial direction from said reactor core region across any heat exchange tubes alongside said first bed inner wall, into and through said first catalyst bed, whereby said fluid reactant stream contacts catalyst to produce a first bed product stream;

(c) flowing said first bed product stream in a substantially radial direction out of said first catalyst bed across any heat exchange tubes alongside said first bed outer wall into said first collection region; and, (d) flowing said first bed product stream in a substantially axial direction from said first collection region to said reactor outlet region or in a substantially radial direction into a second adjacent catalyst bed.

18. A method according to claim 17 wherein said heat exchange tubes are spaced apart and arranged in a generally circular configuration proximate to said first bed inner wall, said first bed outer wall, or both.

19. A method according to claim 17 wherein said heat exchange tubes are spaced apart and arranged in a generally circular configuration proximate to said first bed outer wall.

20. A method according to claim 17 wherein at least some of said heat exchange tubes include fin members.

21. A method according to claim 17 wherein said heat exchange tubes are carrying a flowing heat transfer medium.

22. A method according to claim 17 wherein said heat exchange tubes are heated by internal controlled combustion of a combustible material by feeding the combustible material and an oxidant to the inside of said tubes.

23. A method according to claim 17 wherein said heat exchange tubes comprise electrical resistance heating elements.

24. A method according to claim 17 wherein said reactor interior additionally comprises a second annular-shaped catalyst bed defined by concentric second bed inner and outer walls radially surrounding said first annular-shaped collection region and a second annular-shaped collection region radially surrounding said second catalyst bed, and further comprising the steps of flowing said first bed product stream substantially radially through said first collection region, into and through said second catalyst bed, whereby said first bed product stream contacts the catalyst contained in said second catalyst bed to produce a second bed product stream; flowing said second bed product stream substantially radially out of said second catalyst bed into said second collection region; and, flowing said second bed product stream in a substantially axial direction from said second collection region to said reactor outlet region.

25. A method according to claim 24 wherein said fluid reactant stream is contacted with heat exchange tubes located in said reactor core region.

26. A method according to claim 25 further comprising the step of contacting said first bed product stream with heat exchange tubes located in said first collection region.

27. A method according to claim 26 further comprising the step of contacting said second bed product stream with heat exchange tubes located in said second collection region.

28. A method according to claim 17 further comprising the steps of sequentially flowing said fluid reactant stream from said reactor core region substantially radially into and through a plurality of additional annular-shaped, radially-spaced catalyst beds of increasing diameter, each located in the interior of said reactor, wherein adjacent catalyst beds are separated by annular-shaped collection regions, to yield a final product stream in the last catalyst bed of the sequence.

29. A method according to claim 28 further comprising the steps of contacting the radially flowing stream with axially-disposed heat exchange tubes in a plurality of the annular collection regions between catalyst beds.

30. A method according to claim 28 further comprising the steps of contacting the radially flowing-stream with heat exchange tubes in each of the annular collection regions between catalyst beds.

* * * * *